(12) United States Patent
Kaindl

(10) Patent No.: US 11,903,402 B2
(45) Date of Patent: Feb. 20, 2024

(54) FRUIT PRESS

(71) Applicant: Citrocasa GmbH, Linz (AT)

(72) Inventor: Engelbert Kaindl, Steyr (AT)

(73) Assignee: Citrocasa GmbH, Linz (AT)

( * ) Notice: Subject to any disclaimer, the term of this patent is extended or adjusted under 35 U.S.C. 154(b) by 390 days.

(21) Appl. No.: 17/441,313

(22) PCT Filed: Mar. 31, 2020

(86) PCT No.: PCT/AT2020/060134
§ 371 (c)(1),
(2) Date: Sep. 21, 2021

(87) PCT Pub. No.: WO2020/198773
PCT Pub. Date: Oct. 8, 2020

(65) Prior Publication Data
US 2022/0160015 A1 May 26, 2022

(30) Foreign Application Priority Data
Apr. 1, 2019 (AT) .............................. A 50281/2019

(51) Int. Cl.
*B30B 9/04* (2006.01)
*A23N 1/02* (2006.01)
*A47J 19/02* (2006.01)

(52) U.S. Cl.
CPC ................ *A23N 1/02* (2013.01); *A47J 19/02* (2013.01); *B30B 9/045* (2013.01)

(58) Field of Classification Search
CPC ........... B30B 9/042; B30B 9/045; B30B 9/20; A23N 1/00; A23N 1/02; A23N 1/003; A47J 19/02
See application file for complete search history.

(56) References Cited

U.S. PATENT DOCUMENTS 5,170,699 A * 12/1992 Senalada ................ A23N 1/003
99/507
2012/0024172 A1* 2/2012 Pichler ..................... A23N 1/02
100/208

FOREIGN PATENT DOCUMENTS

| AT | 508 944 A1 | 5/2011 |
| AT | 509 842 A4 | 12/2011 |
| EP | 2 412 252 A1 | 2/2012 |
| EP | 3 206 510 A1 | 8/2017 |
| ES | 1 050 660 U | 5/2002 |

(Continued)

*Primary Examiner* — Jimmy T Nguyen
(74) *Attorney, Agent, or Firm* — Muirhead and Saturnelli, LLC

(57) ABSTRACT

A fruit press has shafts which are mounted in a frame for two pressing rollers, which can be driven in opposite directions, and for two ram heads, which are provided below the pressing rollers and form pressing rams that interact with pressing recesses of the pressing rollers. The fruit press has a blade, which is displaceable in a blade guide between the pressing rollers. The pressing rollers and the ram heads, which can be removed from their respective shafts, are held between a rear wall and a front mount of a handling unit detachably fastened to the frame. To achieve advantageous design conditions, the pressing rollers and the ram heads, which are supported axially on the front mount, are detachably held between bearing projections of the rear wall and receptacles in the region of the front mount.

10 Claims, 3 Drawing Sheets

(56) References Cited

FOREIGN PATENT DOCUMENTS

| WO | WO 2004/052126 A1 | 6/2004 |
| WO | WO 2016/059186 A1 | 4/2016 |
| WO | WO 2017/202780 A1 | 11/2017 |

\* cited by examiner

FRUIT PRESS

TECHNICAL FIELD

The system described herein relates fruit presses.

BACKGROUND OF THE INVENTION

To press fruits, in particular oranges, it is known (WO 2004/05216 A1) to convey the fruits into the nip region between two adjacent pressing rollers, where they are received in semi-spherical pressing recesses and are halved by means of a blade raised between the pressing rollers from below, before the fruit halves in the pressing recesses are pressed by pressing rams, which are arranged on ram heads mounted below the pressing rollers and driven in synchronism with the pressing rollers. These pressing tools are detachably pushed onto parallel, conical, polygonal shafts and are in each case held on their associated shafts, which are mounted in a common frame, by axial securing screws. Since all the parts of such a fruit press that come into contact with the fruits and/or the fruit juice must be cleaned repeatedly, this means that both the pressing rollers and the ram heads, after loosening the respective securing screws, must be removed from their shafts for cleaning purposes, and after being cleaned they must be pushed back onto the shafts and axially secured, which is associated with a considerable amount of work.

To avoid this amount of work, it has already been proposed (WO 2017/202780 A1) to provide the pressing rollers and the ram heads between a rear wall and a front mount of a handling unit, which is fastened by means of two screw anchors to two shafts, arranged diagonally with respect to one another, of the four shafts holding the pressing rollers and the ram heads, so that the handling unit, after loosening the screw anchors, can be removed from the shafts, which are mounted in a frame, by removing the pressing rollers and ram heads from their shafts. The handling unit can therefore be cleaned as a whole in a suitable washing facility. Since the front mount is detachably connected to the rear wall by a threaded bolt, the front mount can be detached from the rear wall when necessary, and the pressing rollers and ram heads can be removed from the handling unit for separate cleaning. This makes it easier to remove the pressing rollers and ram heads from their shafts, but the handling effort remains considerable since, in order to remove the handling unit, the two screw anchors must be loosened and, for the necessary cleaning of the pressing rollers and ram heads, the handling unit must additionally be dismantled in order to be able to clean the pressing rollers and the ram heads per se. Added to this is an additional design effort in order to be able to connect the screw anchors to the shafts, which are mounted such as to be rotatable relative to the front mount.

SUMMARY OF THE INVENTION

It is therefore desirable to design a fruit press such that not only can the handling effort for cleaning be reduced, but also the design conditions can be simplified.

The system described herein provides that the pressing rollers and ram heads, which are supported axially on the front mount, are detachably held between bearing projections of the rear wall and receptacles in the region of the front mount, in that the receptacles for the pressing rollers and ram heads in the region of the front mount are provided with radial insertion slots for axial supporting projections of the pressing rollers and ram heads, and in that the rear wall or the front mount of the handling unit has the blade guide with the blade.

Due to the fact that the pressing rollers and ram heads are supported axially on the front mount of the handling unit connected to the frame, the forces acting on the pressing tools, which on account of the conical shafts act in the direction of pushing the pressing tools off their shafts, are transferred via the handling unit to the frame, so that the design effort associated with securing the pressing tools relative to the shafts by means of screw anchors is eliminated.

Since the receptacles for the pressing rollers and ram heads in the region of the front mount are provided with radial insertion slots for axial supporting projections of the pressing rollers and ram heads, to remove the pressing tools from the handling unit the pressing rollers and ram heads need only be pivoted out so far in the radial direction, in the direction of the insertion slots provided for this purpose, until the pressing rollers and ram heads can be removed from the bearing projections of the rear wall. The handling unit forming the front mount and the rear wall therefore need not be dismantled in order to remove the pressing tools, and thus accordingly can be designed in a stable manner.

By arranging the blade guide and the blade on the rear wall or the front mount of the handling unit, when the handling unit is removed from the frame the blade that comes into direct contact with the juice and pulp of the pressed fruits, together with a guide of the handling unit, is also detached from the frame and can thus be cleaned in a joint washing operation together with the pressing tools and any peel strippers optionally provided in the handling unit. The assignment of the blade and the blade guide to the rear wall or to the front mount of the handling unit requires no particular additional effort since the driving of the blade must take place in synchronism with the pressing tools and is therefore derived from the pressing rollers and/or the ram heads, which are part of the handling unit. However, the blade assembly assigned to the rear wall is provided because of the space available.

Particularly advantageous handling conditions result if the frame, in the fastened position of the handling unit, is sealingly covered by the rear wall thereof since, with such a measure, the laborious cleaning of the frame that would otherwise be necessary can be omitted. On account of the handling unit sealingly covering the frame, heavy contamination of the frame is largely prevented.

In order to be able to clean the blade separately when necessary, the blade guide may include a guide rail for the blade that extends in a plane of symmetry between the pressing rollers, so that the blade can be removed from the rear wall or the front mount of the handling unit along the guide rail.

The handling unit may be detachably fastened to the frame in a simple manner using a fastening bolt which passes through the front mount and the rear wall. If the fastening bolt additionally passes through the blade guide, for example, the guide part that forms the guide surfaces, following the pressing rollers, for the halved fruits, there is no need for separate securing of the blade guide relative to the rear wall or the front mount. The fastening bolt need only be routed in such a way that the bolt does not hinder the blade movement.

BRIEF DESCRIPTION OF THE DRAWINGS

The system described herein is shown by way of example in the drawing, in which.

DESCRIPTION OF VARIOUS EMBODIMENTS

Figure 1:
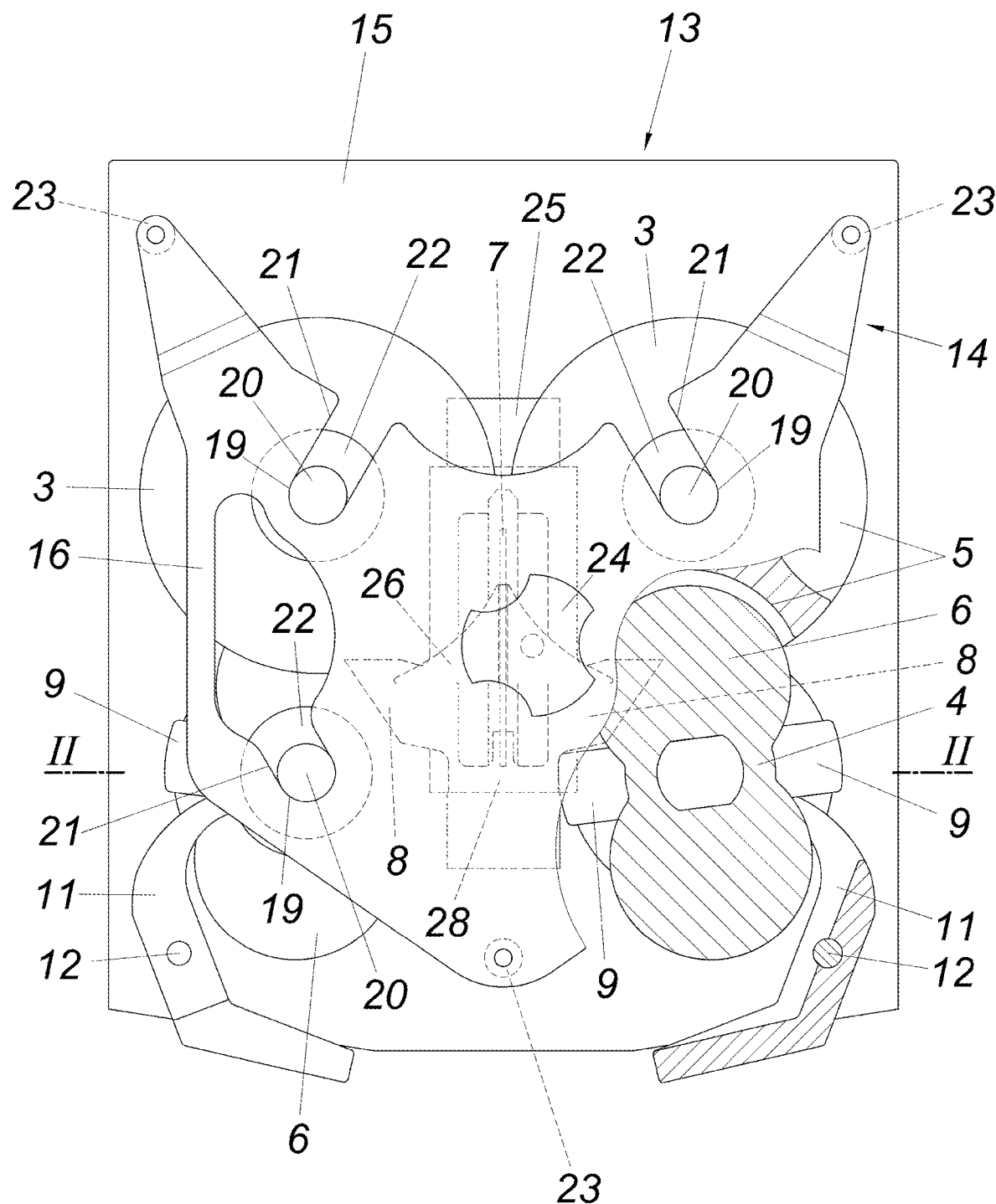
FIG. 1 shows a plan view of a handling unit of a fruit press according to the system described herein.

A fruit press according to the system described herein includes a frame 1, from which parallel shafts 2 protrude for holding two pressing rollers 3 and two ram heads 4. The pressing rollers 3 are provided with semi-spherical pressing recesses 5, which are distributed around the circumference and interact with spherical pressing rams 6 of the ram heads 4. Since the pressing rollers 3 can be driven in opposite directions to the ram heads 4, the pressing rams 6 of the ram heads 4, arranged below the pressing rollers 3, repeatedly engage in the pressing recesses 5 of the pressing rollers 3 while being driven.

Mounted in a vertically displaceable manner in the nip region between the two pressing rollers 3 is a blade 7, which can be displaced in a blade guide 10 via drive cams 9 that rotate with the ram heads 3 and interact with blade stops 8. As fruits are conveyed downwards by the pressing rollers 3, the fruits, which are fed from above into the nip region between the pressing rollers 3 and are received by the pressing recesses 5, the latter being open upwards in the receiving position of the pressing rollers 3, are thus moved past the blade 7, which is moving upwards in the opposite direction and halves the fruits, so that the halved fruits are then pressed in the pressing recesses 5 by the pressing rams 6 engaging in the pressing recesses 5. The peels left adhering to the pressing rams 6 are removed using strippers 11, which are mounted such as to be pivotable about axles 12 and to which a weight moment is applied, so that the strippers 11 are guided into abutment against the pressing rams 6.

For cleaning purposes, the pressing rollers 3 and ram heads 4 must be removed from the shafts 2, which are flattened on opposite sides in order to be driven in rotation. For easier handling, the pressing rollers 3 and the ram heads 4 are combined to form a handling unit 13, which includes a framework 14 formed of a rear wall 15 and a front mount 16 rigidly connected to the rear wall 15. In the framework 14, the pressing rollers 3 and the ram heads 4 are held between the front mount 16 and the rear wall 15. The rear wall 15 forms protruding bearing projections 17, which engage in a centring recess 18 of the pressing rollers 3 and the ram heads 4. The front mount 16 is provided with receptacles 19 for axial supporting projections 20 of the pressing rollers 3 and the ram heads 4. The supporting projections 20 can be inserted into the receptacles 19 through radial insertion slots 21.

The pressing rollers 3 and the ram heads 4 form shoulders 22 for axial support on the front mount 16, which is rigidly connected to the rear wall 15 by spacers 23. As can be seen from FIG. 2, when the bearing projections 17 engage in the centring recesses 18 between the shoulders 22 of the pressing rollers 3 and the ram heads 4 on the one hand and on the front mount 16, there is play corresponding at least to the depth of engagement of the bearing projections 17 in the centring recesses 18. On account of the play, the pressing rollers 3 and the ram heads 4 can be removed axially from the bearing projections 17 and then removed from the handling unit 13 in the direction of the insertion slots 21.

Figure 2:
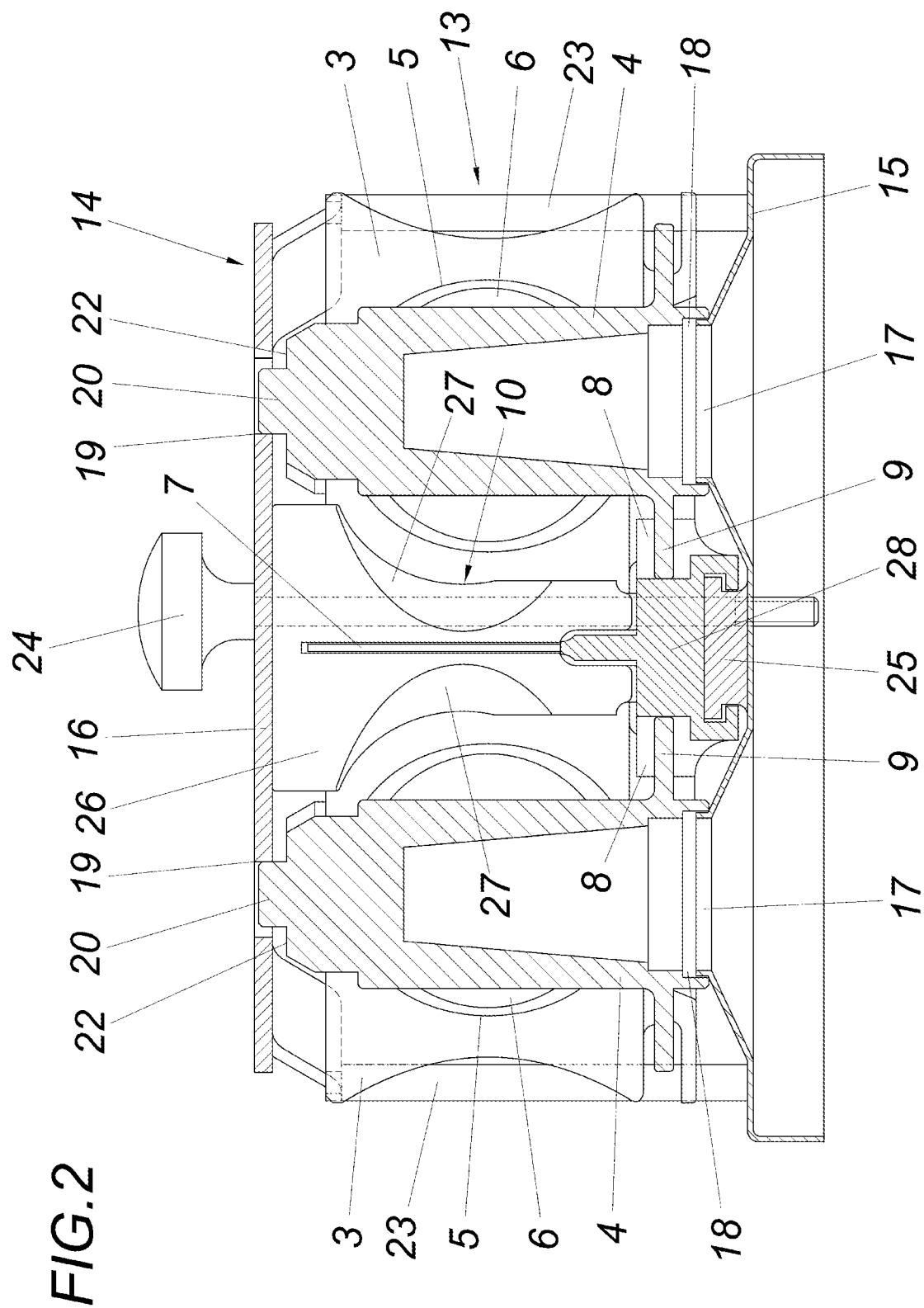
FIG. 2 shows a handling unit in a section along the line II-II of FIG. 1.
Figure 3:
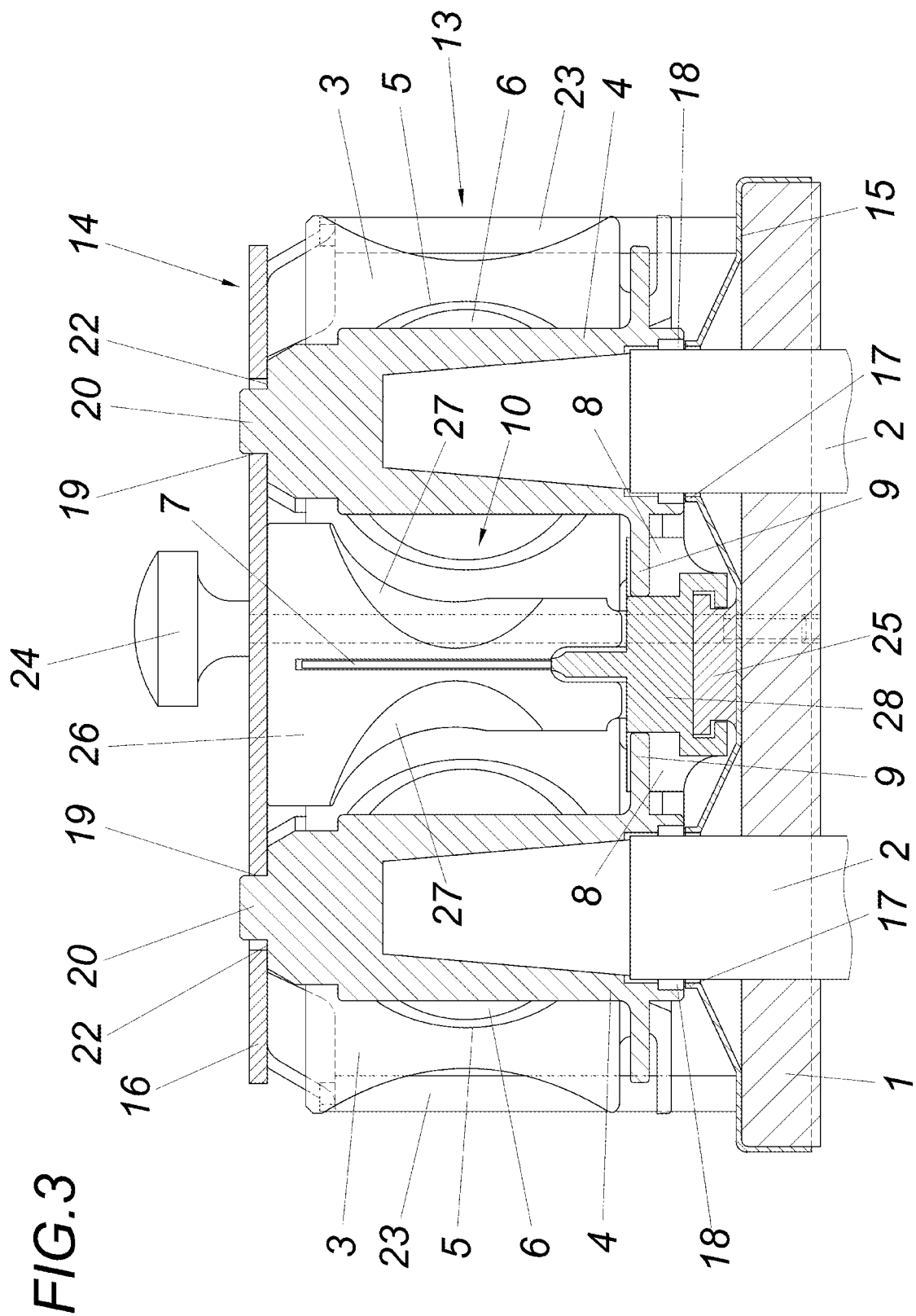
FIG. 3 is an illustration, corresponding to FIG. 2, of the handling unit connected to the frame of the fruit press.

Due to the conicity of the shafts 2, during the pressing operation axial forces act on the pressing rollers 3 and the ram heads 4 in a direction of pushing the pressing rollers 3 and the ram heads 4 off the shafts 2. For this reason, when the handling unit 13 is assembled as shown in FIG. 3, the pressing rollers 3 and the ram heads 4 are supported axially with the shoulders 22 on the front mount 16. This is achieved by suitably adapting the working position of the pressing rollers 3 and the ram heads 4 on the shafts 2 relative to the rigid framework 14. Specifically, when the framework 14 in the position shown in FIG. 2 is fixedly screwed to the frame 1 by using a fastening bolt 24 which passes through the front mount 16 and the rear wall 15, the pressing rollers 3 and the ram heads 4 are first pushed onto the shafts 2 until a form-fitting seat is achieved, which prevents the pressing rollers 3 and the ram heads 4 from being pushed further onto the shafts 2. The framework 14 is then displaced by the play between the front mount 16 and the shoulders 22 until the framework 14 comes to bear against the frame 1, which on the one hand causes the bearing projections 17 of the rear wall 15 to emerge from of the centring recesses 18 of the pressing rollers 3 and the ram heads 4 and on the other hand causes the shoulders 22 of the pressing rollers 3 and the ram heads 4 to bear against the front mount 16.

When removing the handling unit 13, in reverse order the bearing projections 17 are first pushed into the centring recesses 18 before the pressing rollers 3 and the ram heads 4 are removed from the shafts 2 through the rear wall 15 of the framework 14, so that the handling unit 13 removed from the frame 1 again assumes the position shown in FIG. 2.

The blade guide 10 includes a guide rail 25, which according to the embodiment disclosed herein is provided on the rear wall 15, and a guide part 26, which forms guide surfaces 27 for the halved fruits. The blade 7 is mounted on a carriage 28, which is displaceable along the guide rail 25 and has the blade stops 8 that interact with the drive cams 9 of the ram heads 4. Using the fastening bolt 24, which passes through a slot in the carriage 28, the guide part 26 is also secured relative to the rear wall 15 and the front mount 16 so that, once the fastening bolt 24 has been removed, the carriage 28 including the blade 7 together with the guide part 26 can be removed from the framework 14 by being pushed off the guide rail 25.

The strippers 11 are likewise part of the handling unit 13. The axles 12 holding the strippers 11 protrude from the rear wall 15 and form plug-on axles, onto which the strippers 11 are plugged.

Since the blade 7 and the blade guide 10 are assigned to the rear wall 15 and not to the frame 1, only feedthroughs for the shafts 2 are provided in the rear wall 15. This is an advantageous prerequisite for sealing off the pressing chamber with respect to the frame 1 since the rear wall 15 is accordingly closed and sealingly covers the frame 1, as can be seen from FIG. 3.

The invention claimed is:

1. A fruit press, comprising:
   a frame having parallel shafts therein;
   pressing rollers that are driven in opposite directions, each of the pressing rollers having pressing recesses formed around a circumference of the pressing roller and mounted on the respective shafts;
   ram heads provided below the pressing rollers and driven in opposite directions to the pressing rollers to form pressing rams that interact with the pressing recesses of the pressing rollers, the ram heads mounted on the shafts that are spaced from the shafts of the pressing rollers;
   a blade that is displaceable in a blade guide between the pressing rollers, wherein the pressing rollers and the ram heads are removeable from the shafts and are held between a rear wall and a front mount of a handling unit detachably fastened to the frame, wherein the front mount rigidly connected to the rear wall by spacers, wherein the pressing rollers and the ram heads are supported axially on the front mount and are detachably held between bearing projections of the rear wall and receptacles in a region of the front mount, and wherein the receptacles for the pressing rollers and the ram heads in the region of the front mount are provided with radial insertion elongated slots for axial supporting projections of the pressing rollers and the ram heads, and wherein the rear wall or the front mount of the handling unit includes the blade guide with the blade.

2. The fruit press according to claim 1, wherein the rear wall sealingly covers the frame in a fastened position of the handling unit.

3. The fruit press according to claim 1, wherein the blade guide includes a guide rail for the blade that extends in a plane of symmetry between the pressing rollers.

4. The fruit press according to claim 1, wherein the handling unit is detachably fastened to the frame using a fastening bolt that passes through the front mount and the rear wall, the fastening bolt passing through a guide part of the blade guide that forms guide surfaces for halved fruits.

5. The fruit press according to claim 2, wherein the blade guide includes a guide rail for the blade that extends in a plane of symmetry between the pressing rollers.

6. The fruit press according to claim 2, wherein the handling unit is detachably fastened to the frame using a fastening bolt that passes through the front mount and the rear wall, the fastening bolt passing through a guide part of the blade guide that forms guide surfaces for halved fruits.

7. The fruit press according to claim 3, wherein the handling unit is detachably fastened to the frame using a fastening bolt that passes through the front mount and the rear wall, the fastening bolt passing through a guide part of the blade guide that forms guide surfaces for halved fruits.

8. The fruit press according to claim 5, wherein the handling unit is detachably fastened to the frame using a fastening bolt that passes through the front mount and the rear wall, the fastening bolt passing through a guide part of the blade guide that forms guide surfaces for halved fruits.

9. The fruit press according to claim 2, wherein the pressing rollers comprise two pressing rollers and the ram heads comprise two ram heads.

10. The fruit press according to claim 1, wherein the pressing rollers comprise two pressing rollers and the ram heads comprise two ram heads.

* * * * *